(No Model.)
J. D. DODGE.
MARSH HORSESHOE.
No. 464,558.                              Patented Dec. 8, 1891.
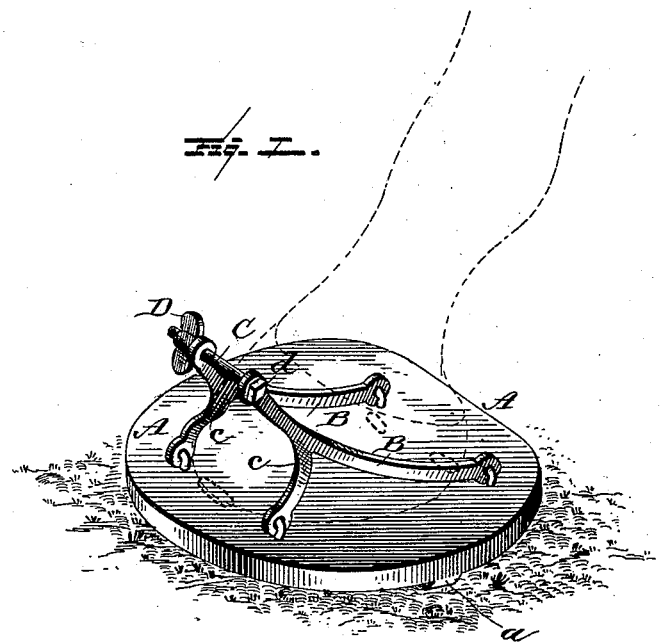
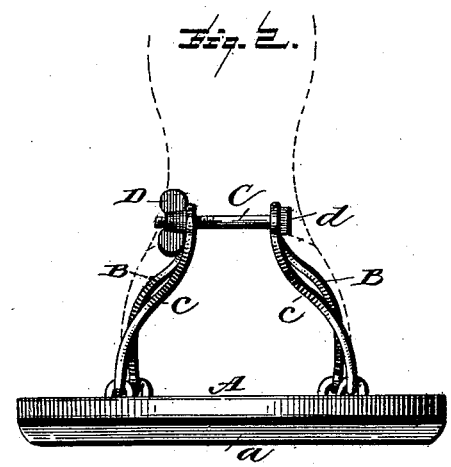
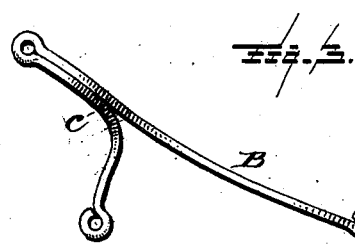
Witnesses
L. C. Hills
R. R. Bond
Inventor
Joseph D. Dodge
by E. H. Bond
Attorney

UNITED STATES PATENT OFFICE.

JOSEPH D. DODGE, OF ROWLEY, MASSACHUSETTS.

MARSH-HORSESHOE.

SPECIFICATION forming part of Letters Patent No. 464,558, dated December 8, 1891.

Application filed September 5, 1890. Serial No. 364,004. (No model.)

*To all whom it may concern:*

Be it known that I, JOSEPH D. DODGE, a citizen of the United States, residing at Rowley, in the county of Essex and State of Massachusetts, have invented certain new and useful Improvements in Marsh-Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in horseshoes; and it has for its object, among others, to provide an improved shoe for use upon soft or marshy ground.

It has for a further object to provide means for holding the shoe to the hoof of the horse by pressure applied where it is so thick as not to injure the hoof and where soreness cannot result. The hoof is not punctured in the application of the shoe. It can be applied by any person without the assistance of a blacksmith or farrier.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a perspective view illustrating my shoe applied to a horse's hoof, which is shown in dotted lines. Fig. 2 is a front view of Fig. 1. Fig. 3 is a perspective view of a portion of the clamp removed.

Like letters of reference indicate like parts throughout the several views.

Referring now to the details of the drawings by letter, A designates the shoe, which is of a substantially horseshoe shape, but solid instead of having the central portion removed, as in ordinary shoes. It is preferably made considerably larger than the hoof to which it is to be applied, so as to form a broad bearing and prevent the hoof from sinking into the marshy ground, for use upon which the shoe is primarily designed. The under face of the shoe is practically flat, except that it is provided with a rib or projection $a$, which preferably extends transversely thereof, as seen in Figs. 1 and 2, and affords a hold for the horse to prevent him from slipping.

The shoe may be used without the horse being shod as well as when the horse is provided with ordinary shoes. In either case the hoof has a firm flat bearing on the shoe A, as will be readily seen from Fig. 1. To adapt it for use when the horse is shod, I provide suitable openings or depressions in the shoe A for the reception of the heel and toe calks of the ordinary shoe, as seen clearly by dotted lines in Fig. 1.

It is desirable to provide for the easy and ready affixing of the shoe to the hoof and speedy removal without the employment of skilled labor. In order to do this I pivot to the upper face of the shoe the arms B, one upon each side of the center of the shoe, as seen in Fig. 1, each arm consisting of a portion to bear against the side of the hoof from front to rear and another portion $c$, which has a bearing upon the hoof at the front beneath the bearing of the first-mentioned portion, as seen in Fig. 2. The forward ends of the arms are connected by the screw-threaded rod or bolt C, which is provided with a head or nut $d$ at one end, and upon the other end works a thumb-nut D, as seen in Figs. 1 and 2. By this means the arms B can be clamped around the hoof and the arms adjusted to different sizes of hoof. The arms extend the whole length of the hoof, and the rearward portions of the arms are curved inward as they approach the rear, so as to prevent withdrawal of the hoof to the rear after the arms have been clamped.

The arms B may sometimes be made of wire bent into the form shown in Fig. 3. Their operation is the same as those above described and shown in Figs. 1 and 2. The arms approach each other at the front, as seen in Fig. 2, so that when the shoe is once clamped to the hoof it cannot be removed without loosening the thumb screw or nut.

I deem it important that the shoe be without a depending flange, as I have found that a depending flange is apt to cut into the earth and take it up and clog the shoe. My transverse rib $a$ will not do this, but affords a better hold to prevent the horse from slipping.

I deem it important that the clamp extend from the front to the rear of the hoof, and that the rear ends of the clamps be bent or curved inward, as seen in Fig. 2, so as to prevent movement of the hoof backward after the clamp or arms have been secured around the hoof. I am thus enabled to securely hold my marsh-shoe upon the hoof of a horse whether he has on other shoes or not, which is considered a most important feature of the invention. Owing to the peculiar form of the arms or clamp the pressure is very slight at the rear of the hoof, just enough to hold the shoe in place and not enough to injure the hoof, which at this point has very thin walls. The pressure increases as the clamp follows the conformation of the hoof forward until the binding-screw is reached, where the walls of the hoof are so thick and strong that any required amount of pressure may be brought to bear thereupon without injury thereto, and thus the shoe may be firmly secured upon the hoof without the presence of the ordinary shoe.

It is also deemed of special importance that the clamps be of the peculiar shape shown, with the two arms of each clamp formed upon compound curves and those at the front and rear reversed, as seen clearly in Fig. 2, and that the portions which receive the binding screw or bolt extend upward from the long lower portions which extend nearly the whole length of the shoe, with the upper ends of said vertical portions turned slightly outward, so that the securing means will not bear upon the hoof, which at the upper part is not hard and is liable to injury from pressure thereon. By this means the pressure on the hoof is near the lower portion or part, where it is hard and can withstand the pressure, the pressure being exerted where the inward curve of the vertical portions comes in contact with the hoof. The same is true of the long arms of the clamps. They bear upon the hoof only at the hard part, where they are provided with the inward curves, as shown.

What I claim as new is—

The combination, with a shoe A, of clamps hinged to the upper face of the shoe, one at each side, each clamp having reverse compound curves affording bearings upon the hoof at the bottom rear portion thereof upon each side and upon the forward or bridge portion thereof, said clamps being provided with downwardly-depending arms which are attached to the forward portion of the shoe, and also provided with adjustable clamping devices at the front, whereby they may be adjustably clamped, as set forth.

In testimony whereof I affix my signature in presence of two witnesses.

JOSEPH D. DODGE.

Witnesses:
 CHARLES A. SAYWARD,
 JOSEPH SPILLER.